(12) United States Patent
Clough et al.

(10) Patent No.: US 6,788,429 B1
(45) Date of Patent: Sep. 7, 2004

(54) REMOTE PRINT QUEUE MANAGEMENT

(75) Inventors: James Clough, Meridian, ID (US); Kevin Pearson, Meridian, ID (US); Brennen W. Stollfus, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/550,539

(22) Filed: Apr. 14, 2000

(51) Int. Cl.[7] .............................................. G06K 15/00
(52) U.S. Cl. ................................ 358/1.15; 358/1.14
(58) Field of Search ................... 358/1.1, 1.13, 358/1.14, 400, 402, 403; 710/8, 10, 15, 17, 19

(56) References Cited

U.S. PATENT DOCUMENTS 5,960,167 A * 9/1999 Roberts et al. ............ 358/1.15

FOREIGN PATENT DOCUMENTS

| GB | 2277184 A | 10/1994 |
|---|---|---|
| GB | 2331387 A | 5/1999 |

* cited by examiner

*Primary Examiner*—Arthur G. Evans

(57) ABSTRACT

A method for managing a print queue over a computer network. The network generally includes at least one user interface, a network server, and at least one print server. The user interface uses a web browser or other mechanism to allow a user to communicate with the network server and the print server. Initially, the user directs the web browser to the network server and chooses a print server. The network server, using device management software, identifies the operating system of the print server and selects a print manager compatible with that operating system. The network server then installs and executes the selected print manager on the print server. Finally, the network server redirects the web browser on the user interface to the print manager on the print server allowing the user to manage a print queue for the print server.

18 Claims, 4 Drawing Sheets

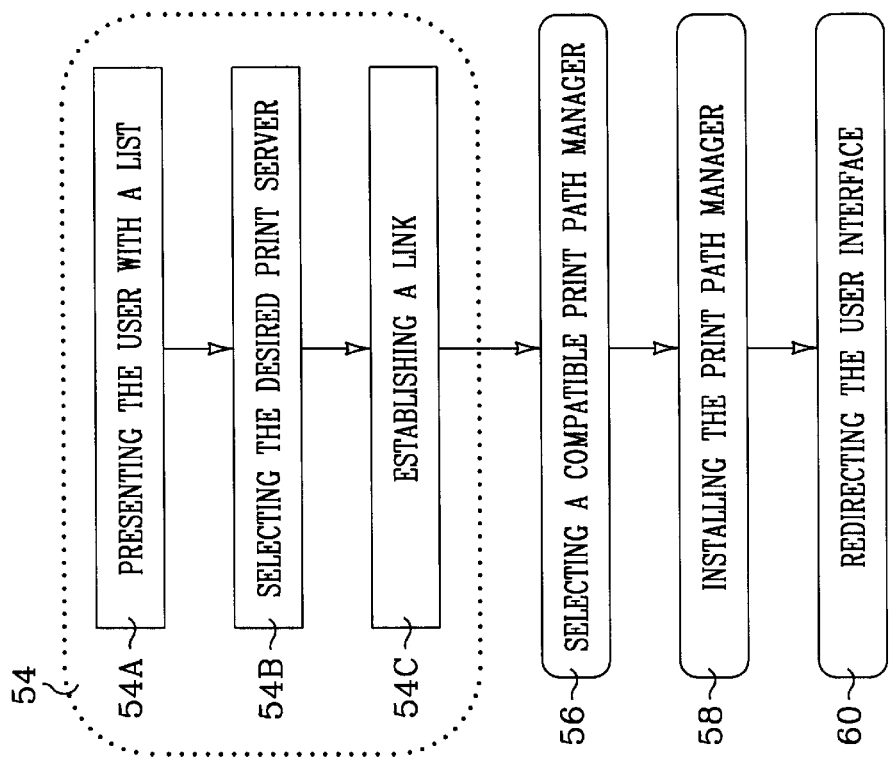

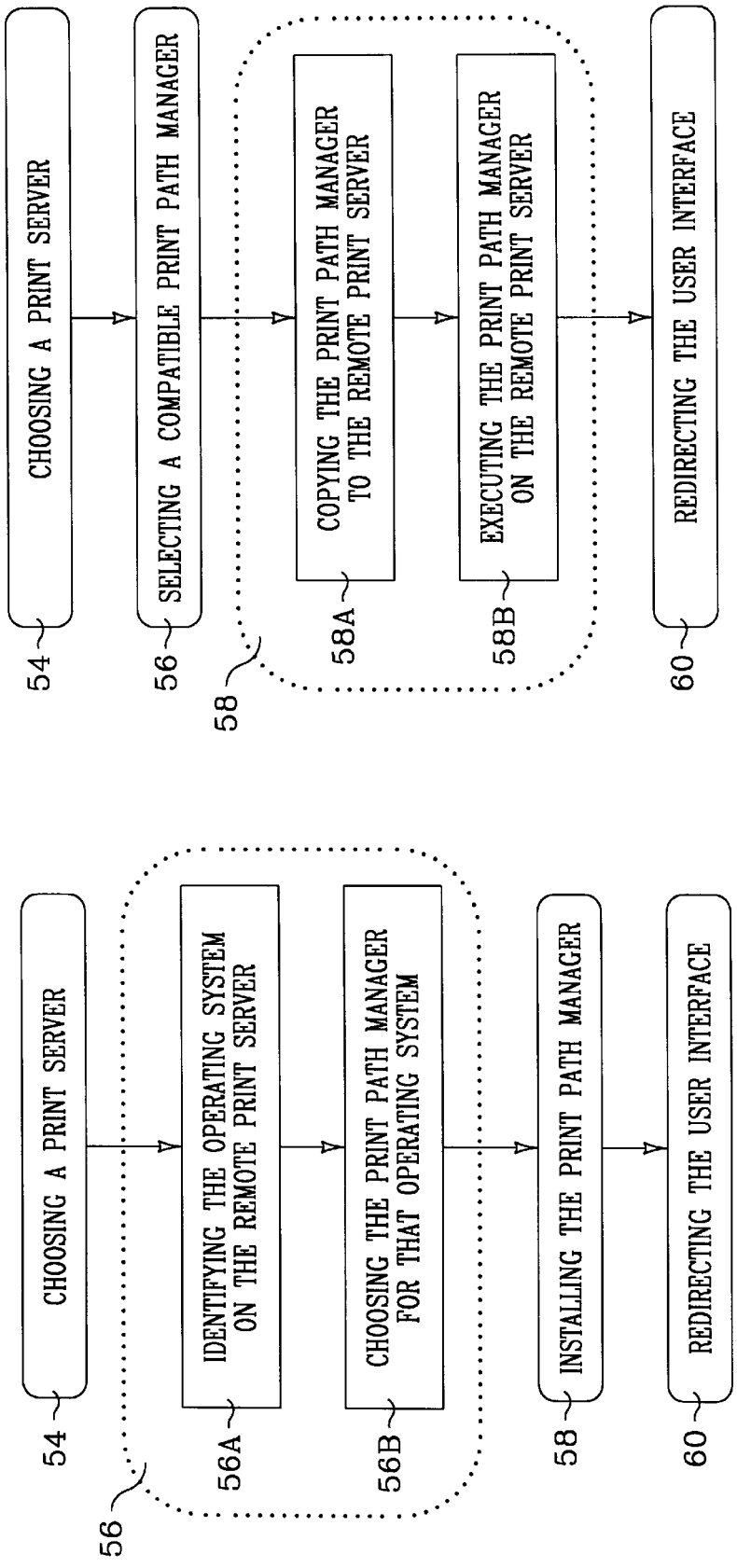

REMOTE PRINT QUEUE MANAGEMENT

FIELD OF THE INVENTION

This invention generally relates to print server administration. More particularly, this invention relates to remote creation and management of print queues.

BACKGROUND OF THE INVENTION

A printer operating on a computer network may receive any number of simultaneous print requests. Because a printer can only produce one printed page at a time, each print request is intercepted and placed into an electronic holding bin often referred to as a print queue. Following a first-in-first-out rule, as the printer finishes one print request, the print queue forwards on the next. However, a user or system administrator may desire to delete the print queue or manage the print queue selecting a printer driver or setting default parameters (e.g., duplex printing, print quality and n-up/multiple page per sheet printing) for a network printer. Device management software, such as Hewlett-Packard Company's Web JetAdmin™, are well known in the art. Operating on a network server, device management software often includes features for centrally establishing and managing a print queue for each printer on the network. These features have been implemented, for example, using the remote print path API (Application Program Interface) provided in Microsoft® Windows® and the remote procedure calls supported on UNIX® platforms.

A computer network may include any number of printers each attached to a different print server. To properly create and manage print queues in this environment, the device management software must contain detailed instructions specific to the operating system for each print server. For each change to a print server, such as a new or updated operating system, the programming for the device management software must also be updated and the new software reinstalled on the network. These changes render the device management software more susceptible to failure.

Additionally, it is not uncommon for a network server and a print server to be using different operating systems or platforms. Unfortunately, present methods for centrally managing print queues do not provide cross-platform support. In other words, conventional device management software does not account for a network and print servers using different operating systems. For example, using present technology, a UNIX® or Linux® network server has difficulty managing a print queue on a Windows® print server.

Consequently, it would be beneficial to provide device management software for managing remote print queues capable of adapting to changes in a computer network. Furthermore, the desired software would provide cross-platform support for each device on the network.

SUMMARY OF THE INVENTION

The invention is directed to a method and software for managing a remote print queue on a computer network. The network includes at least one user interface, a network server, and at least one print server. The user interface uses a web browser or other mechanism to allow a user to communicate with the network server and the print server. To enable remote management of a print queue, the user initially directs the user interface to the network server and chooses the appropriate print server. Device management software operating on the network server identifies the operating system of the print server and selects a print manager (described below) compatible with that operating system. The device management software then installs and executes the selected print manager on the print server. Finally, the device management software redirects the user interface to the print manager on the print server allowing the user to directly manage a print queue on the print server independent of the network server.

A print manager compatible with each operating system to be supported is typically stored on the network server. Preferably, each print manager includes a network interface, typically a web server, and a print queue service. The network interface facilitates communication between the user interface and the print server, while the print queue service includes features for establishing and managing a print queue on the print server. Through the user interface, then, the user can manipulate a print queue on the print server.

Advantageously, the invention provides cross-platform support taking into account different operating systems controlling different devices on a computer network. By providing a separate print manager for each supported operating system, the user, through the user interface, issues commands specific to the operating system of the print server. Moreover, the programming of any software application in which the invented method is embodied need not be updated as new operating systems are introduced to the network. Instead, new print managers need only be installed on each print server with the new operating system.

DESCRIPTION OF THE DRAWINGS

FIG. 3 is a flow diagram of a method for managing a print queue according to one embodiment of the invention.

FIG. 4 is a flow diagram detailing the choosing step of FIG. 3.

FIG. 5 is a flow diagram detailing the selecting step of FIG. 3.

FIG. 6 is a flow diagram detailing the installing step of FIG. 3.

DETAILED DESCRIPTION OF THE INVENTION

Figure 1:
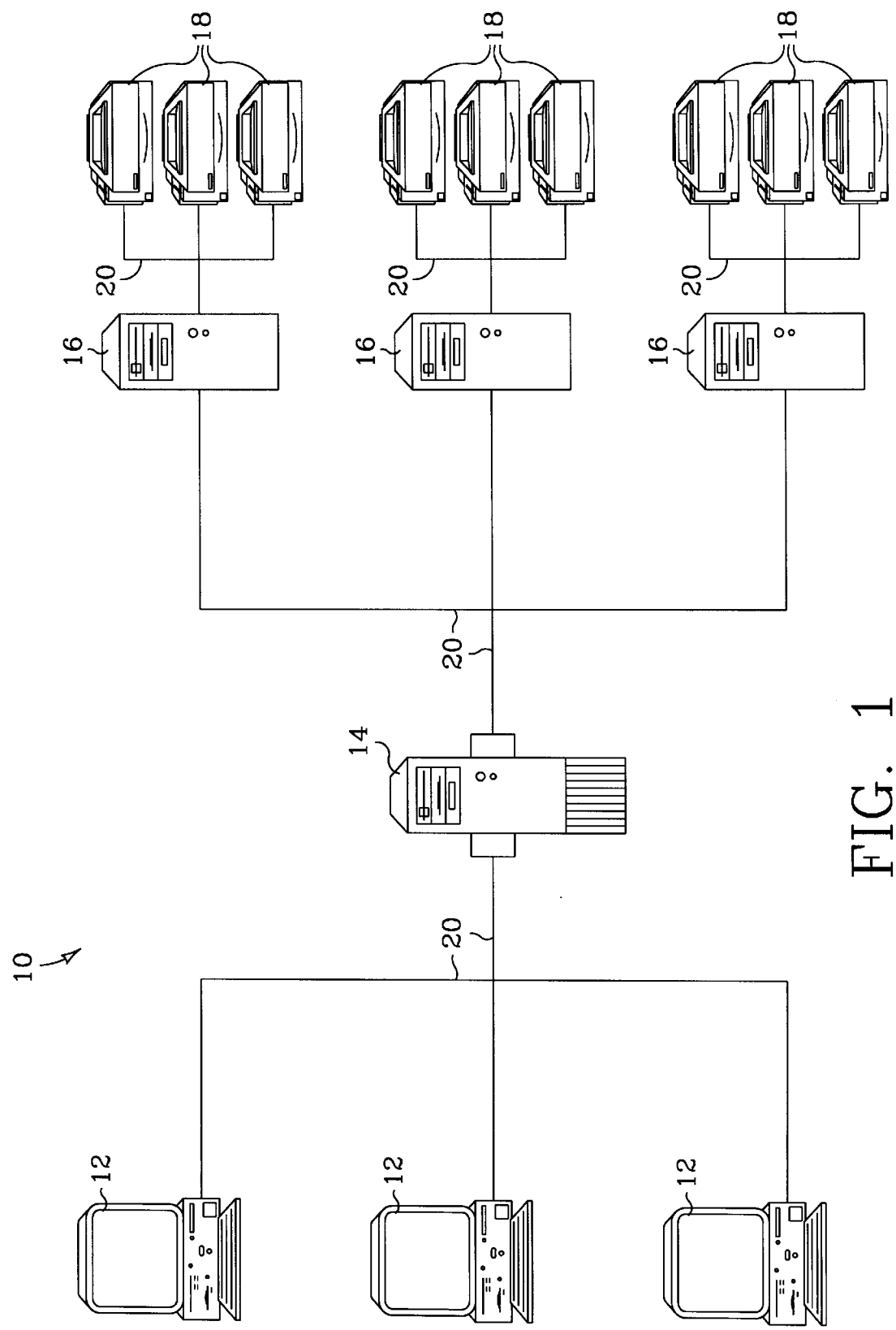
FIG. 1 is a schematic representation of a computer network on which the invention may be implemented.

Although the various embodiments of the invention disclosed herein will be described with reference to the computer network 10 shown schematically in FIG. 1, the invention is not limited to use with network 10. The invention may be implemented in or used with any computer system in which it is necessary or desirable to manage a print queue. Referring to FIG. 1, network 10 represents generally any local or wide area network in which a variety of different electronic devices are linked. Network 10 includes one or more user interfaces 12, typically personal computer workstations, a network server 14, print servers 16 and printers 18. Communication link 20 interconnects user interfaces 12, network server 14, print servers 16 and printers 18. Communication link 20 represents generally a cable, a wireless or remote connection via a telecommunication link, an infrared link or a radio frequency link, or any other connector or system that provides electronic communication between the network devices. The path followed by link 20 between network devices 12, 14, 16 and 18 in the schematic view of FIG. 1 represents the logical communication path between these devices, not necessarily the physical path between the devices. That is to say, for example, that print servers 16 need not be physically interposed between network server 14 and their respective printers 16. Rather, network devices can be connected to the network at any point and the appropriate communication path established logically between the devices which, in this example, would be from network server 14 to print servers 16 and then to the respective printers 18.

Figure 2:
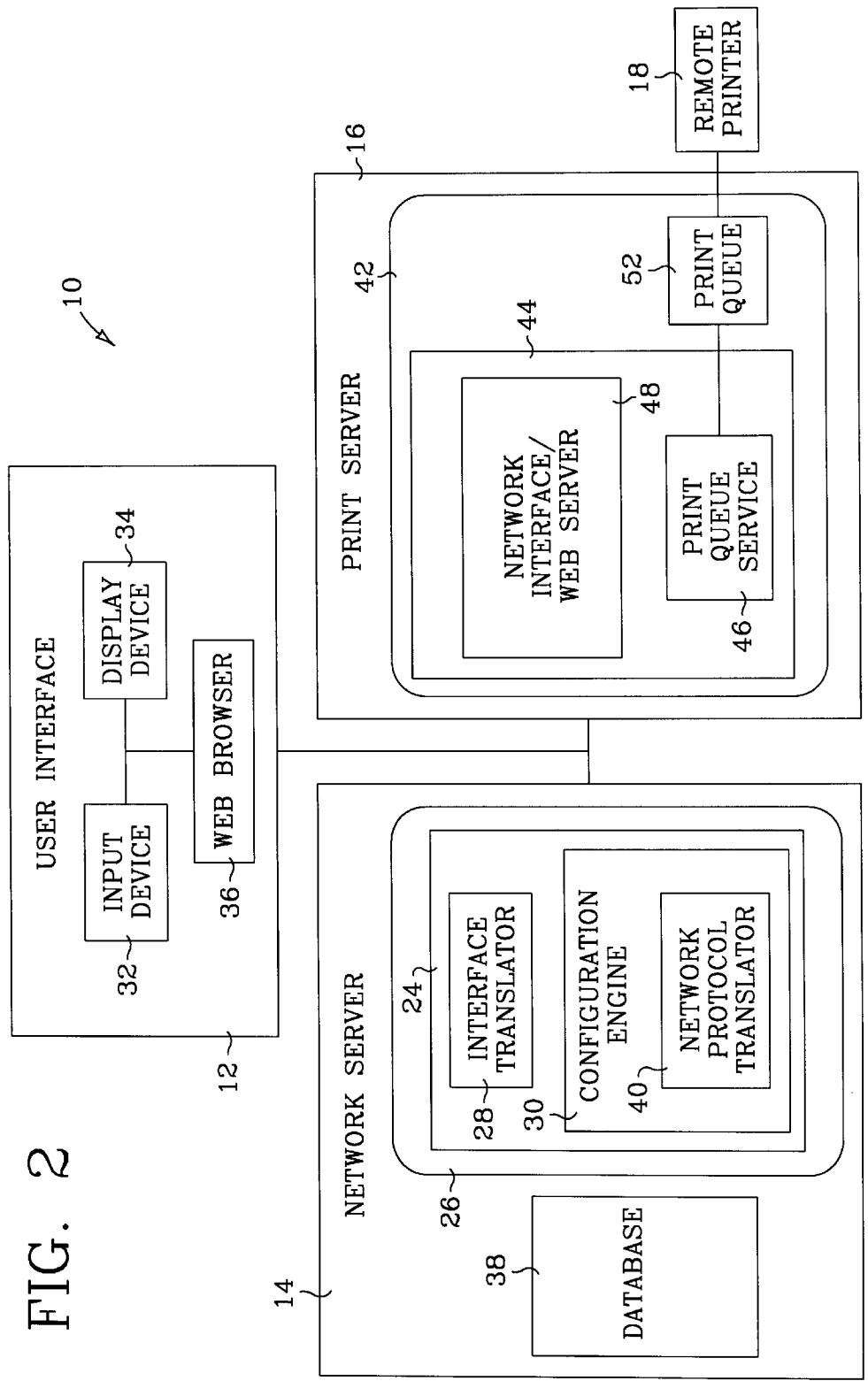
FIG. 2 is a block diagram showing selected components from the network of FIG. 1 in which the invention is embodied in software running on the network server.

In FIG. 2, the invention is embodied in device management software 24 running on network server 14. Server 14 utilizes a first operating system 26. Software 24 includes interface translator 28 and configuration engine 30. User interface 12 provides a mechanism for the user to send information to and receive information from software 24 on network server 14. User interface 12, therefore, generally includes a keyboard and/or a pointing device such as a mouse or other suitable input device 32 and a computer monitor or other suitable display device 34. For this embodiment of the invention, user interface 12 includes web browser 36 capable of establishing an electronic link with network server 14 and print server 16. Using HTML (Hypertext Markup Language) scripts, for example, interface translator 28 generates and translates information received by and sent from web browser 36 on user interface 12. Interface translator 28 processes data entered by the user into a form usable by configuration engine 30 and translates information from the configuration engine 30 into a form the user can interpret. Database 38 provides software 26 with the ability to save and retrieve information used to configure and manage print server 16.

Configuration engine 30 is responsible for generating, monitoring, and receiving network communications specific to the configuration of print server 16 and printer 18. Configuration engine 30 will generally include a network protocol translator 40 such as a SNMP (Simple Network Management Protocol) translator or similar mechanism allowing bi-directional communication with print server 16 over network 10.

To accept simultaneous print requests directed to printer 18 over network 10, a print queue is established on print server 16. Generally speaking, a print queue is an electronic holding bin allowing an operating system to manage simultaneous print requests sent to a single printer. Referring to FIG. 2, to establish and manage a print queue on print server 16, the user directs user interface 12 to network server 14 and initiates device management software 24. First the user chooses print server 16. Configuration engine 30 then detects operating system 42 on print server 16 and selects a compatible print manager 44 (described in more detail below) from database 38. Configuration engine 30 installs and executes print manger 44 on print server 16 over network 10. Alternatively, the user may manually install and execute print manger 44 on print server 16. Finally, configuration engine 30 redirects user interface 12 to print manager 44 now operating on print server 16. Once print manager 44 is installed, user interface 12 can bypass network server 14 and connect directly to print manager 44 to manage a print queue on print server 16.

Database 38 contains a different print manager for each operating system supported by device configuration manager 26. Database 38 may be located on an electronic storage device connected directly to network server 14 or on any other device accessible to server 14 through network 10. Database 38 may also be located on a removable media source such as a CD ROM or floppy disk.

Print manager 44 is software that when executed allows user interface 12, communicating directly with print server 16, to create (if necessary) and manage a print queue on print server 16 even though user interface 12, network server 14, and print server 16 may be running on different operating systems. Print manager 44 includes a print queue service 46 and network interface 48. Although it is expected that network interface 48 will usually be implemented as a web server, as shown in FIG. 2, network interface 48 may be any suitable software for facilitating communication between user interface 12 and print queue service 46 over network 10. Print queue service 46 is responsible for creating and managing print queue 52 on print server 16. Using HTML scripts, for example, web server 50 sends information from print queue service 46 to web browser 36 on user interface 12. The user, through input device 32, can create or modify print queue 52 as desired by returning instructions to web server 48. Web server 48 instructs print queue service 46 to create or modify print queue 52 accordingly.

The operation of this embodiment of the invention will now be described with reference to FIGS. 2 and 3. Through user interface 12, the user chooses the desired print server 16 (step 54 in FIG. 3). Configuration engine 30 then selects a print manager 44 compatible with print server 16 (step 56). Configuration engine 30 installs the selected print manager 44 on print server 16 (step 58) and redirects web browser 36 of user interface 12 to web server 48 (step 60) allowing the user to directly create and manage print queue 52 and bypass network server 14.

One preferred version of the details of each step in FIG. 3 is shown in FIGS. 4–6. As illustrated in FIG. 4, when choosing print server 16, configuration engine 30 presents a list of available printers 18 to user interface 12 (step 54a). Through user interface 12, the user selects a printer 18 (step 54b), and configuration engine 30 establishes an electronic communication link with print server 16 for selected printer 18 (step 54c). Referring to FIG. 5, when selecting print manager 44, configuration engine 30 first identifies operating system 42 of print server 16 (step 56a) and then, from database 38, selects a print manager compatible with operating system 42 (step 56b).

In the installing step 58 detailed in FIG. 6, configuration engine 30 copies the selected print manager onto print server 16 in step 58a. This step is generally accomplished through standard file management commands for electronically duplicating the print manager and transferring the duplicate over network 10. Once transferred, configuration engine 30 remotely executes print manager 44 on print server 16 in step 58b. For example, step 58a may be accomplished using the network file system supported by UNIX® or through Windows'® SMB (Server Message Block) network file system. Step 58b may be accomplished using the service control manager provided by Windows® or by using the "rexec" function supported on UNIX® platforms. Alternatively, those steps may be accomplished by manually transferring and executing print manager 44.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method for managing a print queue on a computer network that includes a user interface, a print server and a network server, the method comprising:

selecting a print manager compatible with the print server;

installing the selected print manager on the print server; and directing the user interface from the network server to the print manager installed on the print server.

2. The method of claim 1, wherein the act of selecting comprises identifying the operating system of the print server and selecting a print manager compatible with that operating system.

3. The method of claim 1, wherein the act of installing comprises the network server copying the selected print manager to the print server and executing the selected print manager on the print server.

4. The method of claim 3, wherein the act of copying comprises duplicating the selected print manager and transferring the duplicate print manager from the network server to the print server over the computer network.

5. The method of claim 3, wherein the act of executing comprises remotely executing the selected print manager on the print server over the computer network.

6. A method for managing a print queue on a computer network that includes a user interface, a print server and a network server, the method comprising:

choosing a print server on the computer network using the user interface;

identifying the operating system controlling the print server;

installing a print manager on the print server; and directing the user interface to the print manager installed on the print server.

7. The method of claim 6, wherein the act of choosing comprises:

presenting a list of print servers to the user interface;

selecting the desired print server; and establishing an electronic communication link between the network server and the selected print server.

8. The method of claim 6, wherein the act of installing comprises:

selecting a print manager that is compatible with the identified operating system;

duplicating the selected print manager; and transferring the duplicate print manager from the network server to the selected print server over the computer network.

9. The method of claim 8, further comprising remotely executing the print manager installed on the print server.

10. A computer program product capable of managing a print queue on a computer network that includes a user interface, a print server and a network server, the product comprising a computer useable medium having computer readable instructions thereon for:

selecting a print manager compatible with the print server;

installing the selected print manager on the print server; and directing the user interface from the network server to the print manager installed on the print server.

11. The product of claim 10, wherein the instructions for selecting comprise instructions for identifying the operating system of the print server and selecting a print manager compatible with that operating system.

12. The product of claim 10, wherein the instructions for installing comprise instructions for the network server copying the selected print manager to the print server and executing the selected print manager on the print server.

13. The product of claim 12, wherein the instructions for copying comprise instructions for duplicating the selected print manager and transferring the duplicate print manager from the network server to the print server over the computer network.

14. The product of claim 12, wherein the instructions for executing comprise instructions for remotely executing the selected print manager on the print server over the computer network.

15. A computer program product capable of managing a print queue on a computer network that includes a user interface, a print server and a network server, the product comprising a computer useable medium having computer readable instructions thereon for:

choosing a print server on the computer network using the user interface;

identifying the operating system controlling the print server;

installing a print manager on the print server;

directing the user interface to the print manager installed on the print server.

16. The product of claim 15, wherein the instructions for choosing comprise instructions for:

presenting a list of print servers to the user interface;

selecting the desired print server; and establishing an electronic communication link between the network server and the selected print server.

17. The product of claim 15, wherein the instructions for installing comprise instructions for:

selecting a print manager that is compatible with the identified operating system;

duplicating the selected print manager;

transferring the duplicate print manager from the network server to the selected print server over the computer network.

18. The product of claim 17, further comprising instructions for remotely executing the print manager installed on the print server.

* * * * *